United States Patent [19]

Reis

[11] Patent Number: 5,074,713

[45] Date of Patent: Dec. 24, 1991

[54] CONNECTOR MODULE TO DEAL WITH, EXTEND AND REPAIR UNDERSEA LINES, OPERATED BY REMOTELY OPERATED VEHICLE

[75] Inventor: Ney R. Salvi dos Reis, Rio de Janeiro, Brazil

[73] Assignee: Petroleo Brasileiro S.A., Rio de Janeiro, Brazil

[21] Appl. No.: 607,424

[22] Filed: Oct. 31, 1990

[30] Foreign Application Priority Data

Nov. 1, 1989 [BR] Brazil ................................ PI 8905595

[51] Int. Cl.⁵ ........................... F16L 1/12; B63C 11/52
[52] U.S. Cl. ..................................... 405/169; 405/191
[58] Field of Search ............... 405/169, 185, 188, 190, 405/191; 166/338, 344, 347

[56] References Cited

U.S. PATENT DOCUMENTS

| | | | |
|---|---|---|---|
| 3,520,358 | 7/1970 | Brooks et al. | 405/191 X |
| 4,661,017 | 4/1987 | Wood et al. | 405/169 |
| 4,682,913 | 7/1987 | Shatto et al. | 405/169 |
| 4,974,996 | 12/1990 | Vielmo et al. | 405/188 |

*Primary Examiner*—David H. Corbin
*Attorney, Agent, or Firm*—Sughrue, Mion, Zinn, Macpeak & Seas

[57] ABSTRACT

A system to deal with and extend and repair undersea lines, worked by remotely operated vehicle is provided, consisting of an integrated system of lines and connector modules, aforesaid connector module consisting of a metallic structure which houses a loop of pipe fitted at its forward and back ends with valves worked by ROV and forged connectors and in its upper part with a T branch-off fitted at its ends with valves worked by ROV and forged connectors, respectively, said metallic structure being fitted laterally with hot-lines.

3 Claims, 3 Drawing Sheets

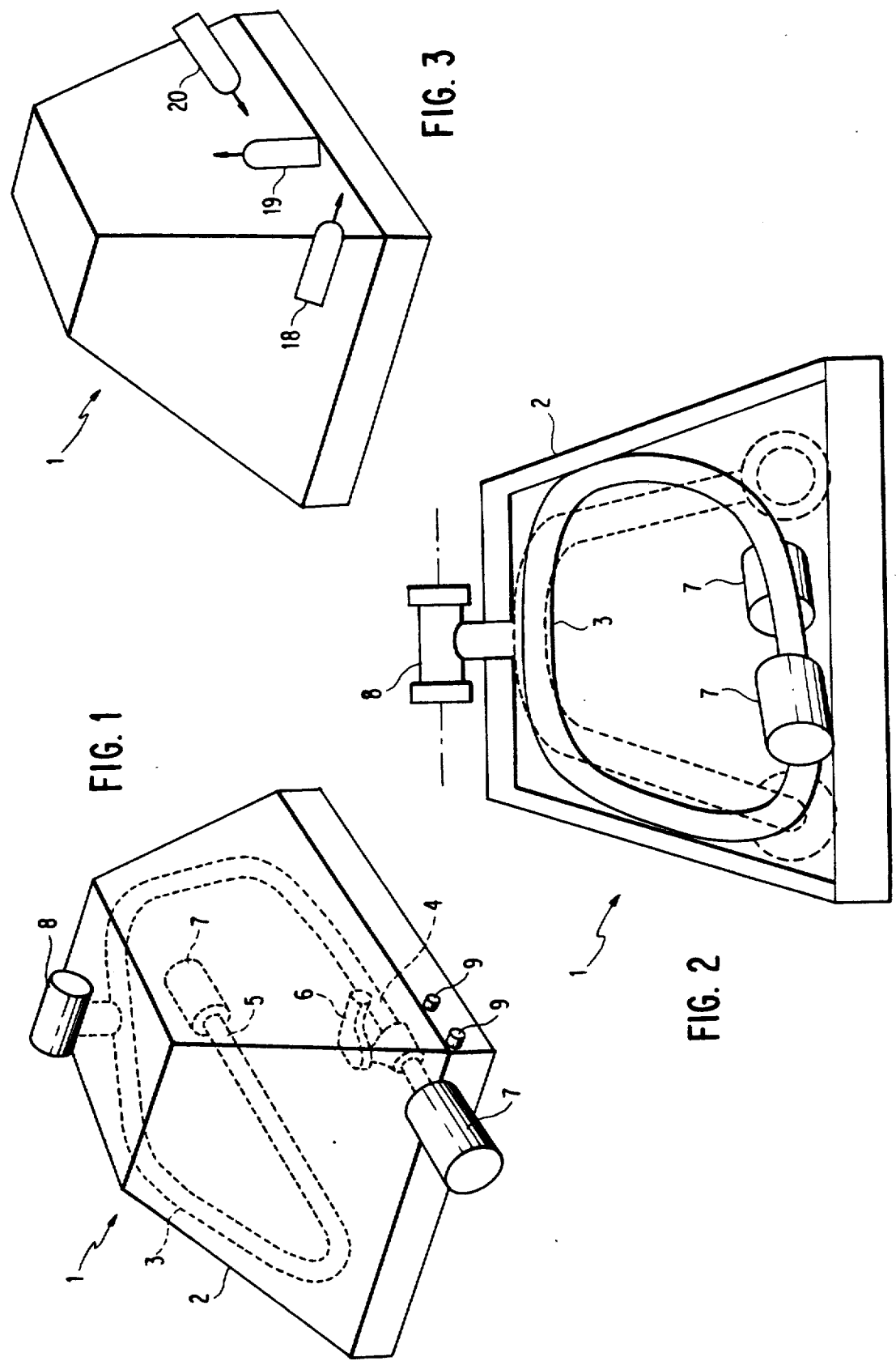

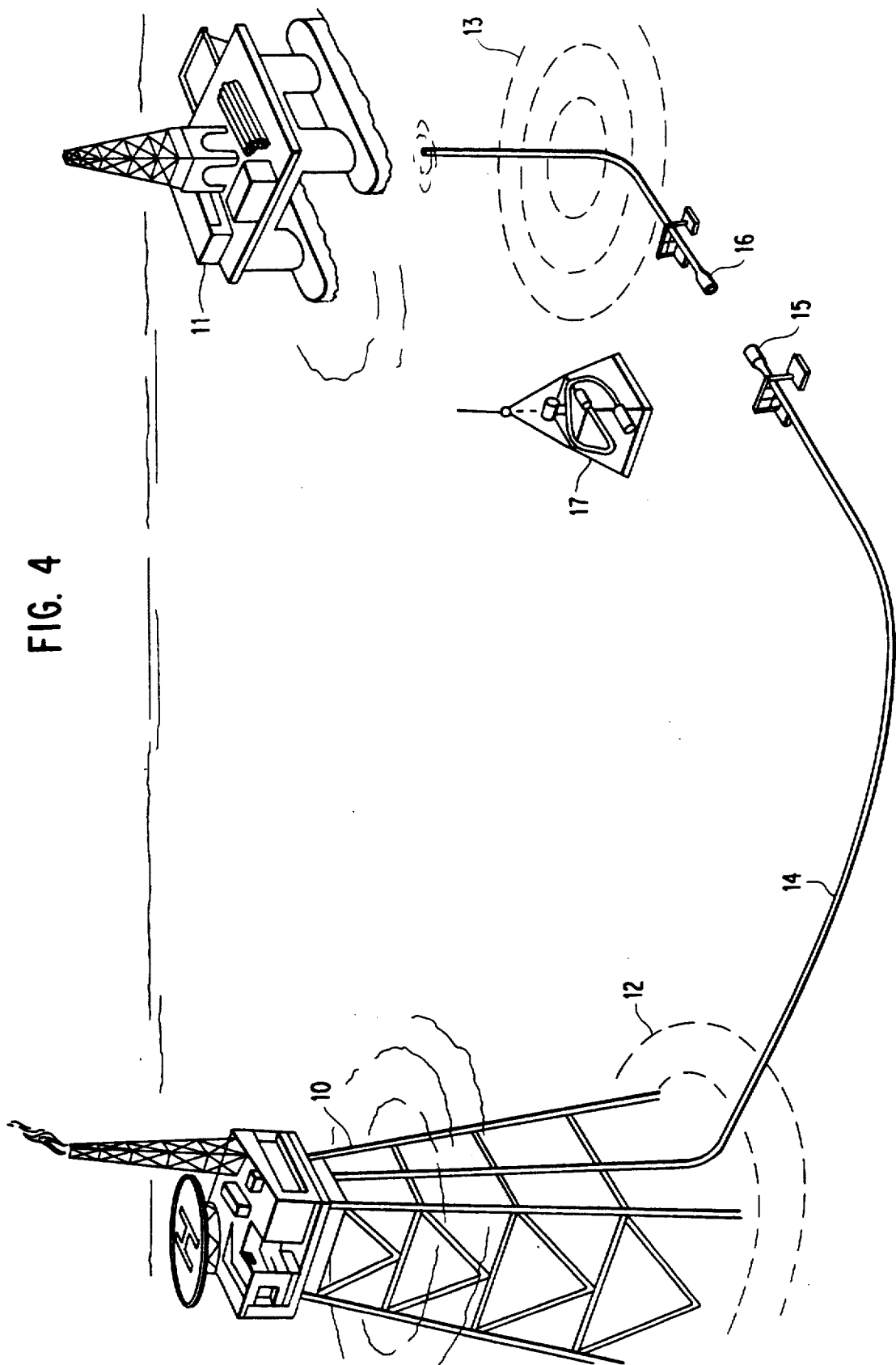

CONNECTOR MODULE TO DEAL WITH, EXTEND AND REPAIR UNDERSEA LINES, OPERATED BY REMOTELY OPERATED VEHICLE

FIELD OF THE INVENTION

This invention concerns a system to deal with and extend and repair undersea lines, worked by remotely operated vehicles, so as to enable oil, gas and hydrocarbons in general, flowing in a pipeline system, where laid below the reach of known conventional saturation diving methods, to be dealt with the aid of remotely operated vehicles (ROV's) and suitable interfaces.

BACKGROUND OF THE INVENTION

As everyone knows a great many pipelines running along the bottom of the sea are likely to have to undergo repairs because of damage of various kinds suffered by them, as for instance, cutting by anchors, the leaking of fluid from inside the lines because of welding flaws, and also due to damage caused by a lack of cathodic or anti-corrosion protection.

Those well versed in the state of this art also know that much has been done towards achieving a system to deal with the repair of undersea lines in a way sufficiently efficient to meet the requirements of well-known operators and concerns working in this field. Among the systems known and in development at present one might briefly refer to, a) the "CAMERON" system, which makes use of a mechanical connector, cold forged at a pressure of about 1400 kg/cm$^2$. It is used with some aid from divers or remotely operated vehicles, acting only upon the pipe to be repaired, spreading it into the coupling grooves and aligning itself with the pipeline, and when the connection is fixed onto the pipeline it also gives rise to a metal structure base which acts as a guide in the remedying of any fresh stretch of pipe. This system might become part of a wider repair system; b) the "SNAM" system which is an all-encompassing undersea pipeline repair system provided with accessories meant to clean, cut, and align the pipeline with the aid of ROV's and boat fitted with DP. It makes use of a cold forging system along with deformation of pipe and connector, namely a mechanical action, without use of any elastomers, in which deformation takes place in both parts to be joined. That is, the pipe is expanded into the connector, which also expands, but the connector material tries to return to its former state more strongly than does the pipe, and adds to the effect of such action, because of the different properties of the two metals. This makes this system seal better than does the CAMERON forged connector system, since several interference grooves come into being, thereby increasing interaction of the bodies concerned, such a system is disclosed in U.S. Pat. No. 4,648,626 of Mar. 10, 1987; c) the "ALSTHOM" fully designed system, provided with accessories to cut and clean both inside and outside, to remove concrete and casing. It employs a mechanical connector, only the end of pipe being cold forged, where a collar so formed provides the metal to metal seal with the connector. It makes use of amore complicated and less reliable forging process in terms of average and long term life than for the CAMERON and SNAM systems previously referred to; d) the "HYDROTEC" system, which makes use of Atmospheric Diving System (ADS) diving gear; which belongs to "Oceaneering". The system employs mechanical connectors adjusted with the aid of a manipulator—BMF (Bottom Manipulating Frame); e) the "ELF EQUITAINE" system is one that is part of and further to the "ALSTHOM" system referred to above. Mechanical connectors are used and they are laid on pipes that have had cold forging treatment; and f) the "IRDS" (International Robotics Diving Systems) system which uses the undersea pipeline aligning and repair supporting THOR system. The THOR system has many accessories that make it quite a practical system, and the connector and/or repairs are done by TIG orbital welding, which requires the aid of divers.

From the foregoing present trend is to ever-increasing use mechanical connectors, which are able to remedy evaluations, take up misalignments, and even be reused if wanted. Against such technique there is the fact that certain kinds of connectors employ gaskets and/or elastomers for sealing purposes, which are likely to age and even to leak after some time.

Furthermore, in spite of hyperbaric welding having been used for the great number of undersea pipeline repairs up to now, it is of general opinion, that repairs carried out with this technique, in addition to being complicated because of the safety of the men engaged in such work, also seriouly curbs any automation of the process, because of the environmental factors that directly affect the quality and the final result of the repairs done. It is generally acknowledged that repairs that follow this technique are hardly feasible in deep waters without the aid of divers (400 m), which means that repairs done with mechanical connectors are to be preferred in deep waters, since they are more easily automated.

SUMMARY OF THE INVENTION

This invention provides a system to intervene with, extend and repair undersea pipelines, which is worked by a remote operational vehicle (ROV), system being meant for great depths in the sea, where it is impossible to work with divers, thus enabling a pipeline system in which oil, gas and hydrocarbons in general flow but which is beyond the reach of known and conventional saturation diving methods, with the aid of remote operation vehicles (ROV's) and suitable interfaces.

DESCRIPTION OF THE PREFERRED EMBODIMENT

The invention refers to a system of integrated pipelines and connector modules, the connector modules being the heart of the system, and consisting essentially of a metallic structure (modular) which houses a pipeline loop with a by-pass in its upper part and connectors fitted with valves at the ends thereof, which are linked up to the ends of a pipeline laid previously or with a stretch of line to be repaired. The loop ends are fitted with forged mechanically operated connectors, as well as all other stretches of the pipeline, thus making all connectors accessible, possible and matching one another.

In the upper part of the connector module a stand-by T branch-off enables other connections to be made to the pipelines in operation where needed as a hot-tap or because of some mishap to any stretch of the line either up or down stream. Such a connector acts as a by-pass for a new stretch of pipe which when connected to the stand-by T and after the proper valves have been operated enables flow of product to promptly go ahead once again and the damaged stretch of pipe to be withdrawn and repaired. There is also the advantage of being able to repair or replace smaller lengths of pipe anyway, without there being any pressure, while production still goes on.

With the aid of the system of this invention the time needed to carry out repairs on a pipeline becomes noticeably less, running costs drop and, if wanted, production can recommence much more swiftly than is usual, thus bringing about substantial saving and improved safety for both plant and those who use it.

A further great advantage of the connector module is that not only does it make use of the tolerances claimed by the makers of the connectors already on the market but also the loop of pipe inside the metal structure can be shifted in three ways by hydraulic devices, which means that the ends thereof can be adjusted in three dimensions and not just linearly as in the existing systems, and this leads to a volume of space within which remaining pipe ends can be adjusted as required, and in which all misalignments, whether axial, longitudinal, or of elevation are taken up.

Other purposes, features and advantages of this invention will now be made clearer from the description which follows, together with the drawings attached hereto.

BRIEF DESCRIPTION OF THE DRAWINGS

FIG. 1 is an enlaged perspective view showing the connector module used in the system of this invention.

FIG. 2 is an enlarged front view of the connector module shown in FIG. 1.

FIG. 3 is a diminished view in perspective of the metal structure of the connector module, showing the hydraulic devices that enable three-dimensional adjustment of the ends thereof to take place.

FIG. 4 is a perspective view which shows how replacement in an undersea pipeline, the major purpose of the intended system, takes place, using the connector module of the invention.

DETAILED DESCRIPTION OF THE INVENTION

Figure 5:
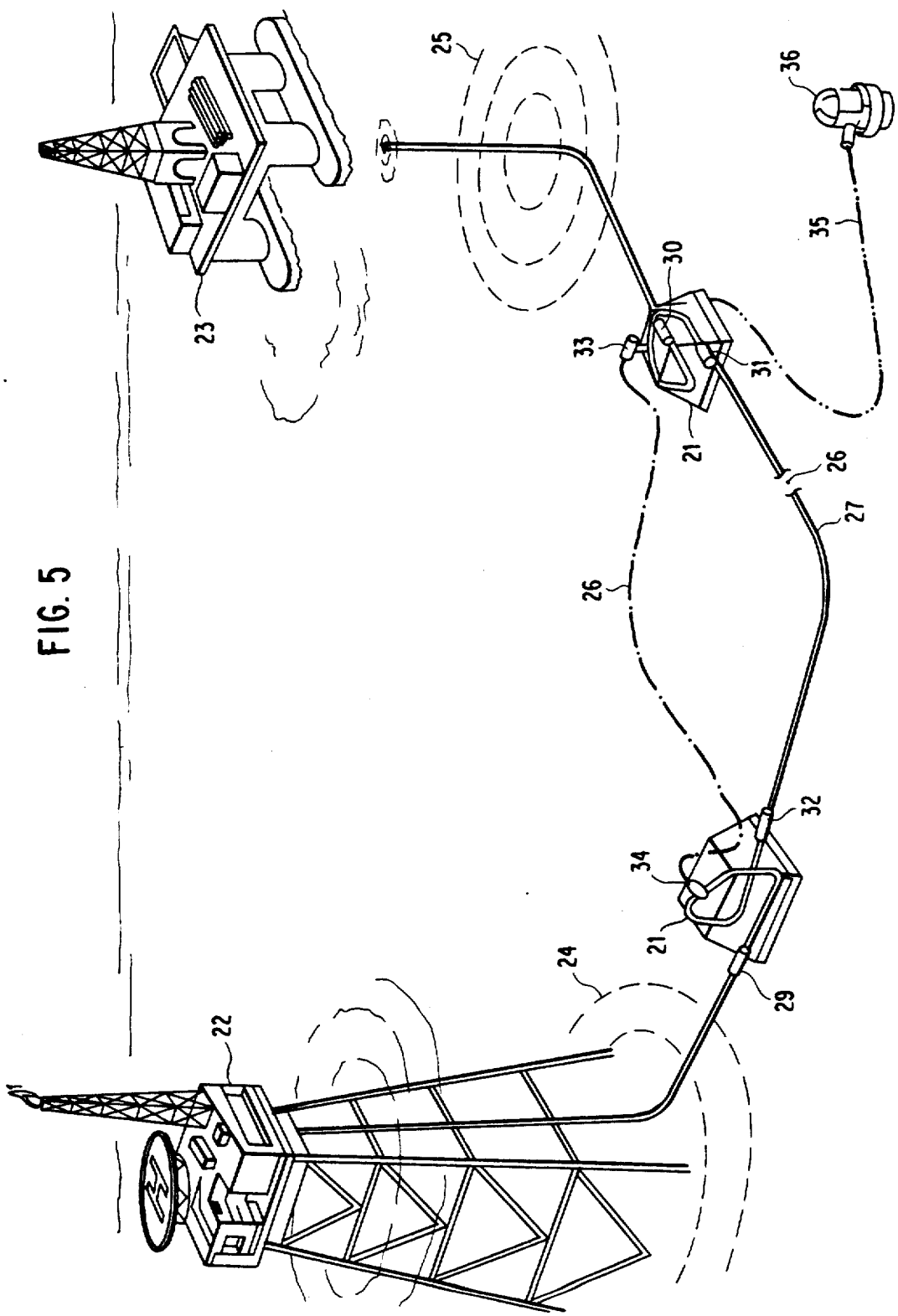
FIG. 5 shows how a damaged stretch can be replaced and a new stretch put in a system provided with this invention.

As is to be seen from the Figures referred to this system for dealing with, extending and repairing undersea lines, with the aid of a remotely operated vehicle, the undersea pipeline has to be provided with connector modules (1), consisting of a modular metal structure (2), made of a substance suitable for the environment concerned, preferably carbon steel, in which a loop of pipe (3) is housed, made of special steel, preferably, a flexible pipe. Forward (4) and rear (5) ends are fitted with valves (6) workable by a remotely operated vehicle (ROV) and forged connectors (7). The upper part of the module (1) is fitted with a stand-by T branch-off (8). Such metallic structure (2) is also provided laterally with hot-lines (9) to work the hydraulic devices that enable three-dimensional adjustment of the ends of the aforesaid connector module (1) to take place.

It should also be pointed out that, though not shown in FIGS. 1 and 2, back end (5) thereof, has a valve upstream of forged connector (7) which is operated by a remotely operated vehicle (ROV) and stand-by T branch-off (8) also has valves at its ends which are to be operated by such remotely operated vehicle (ROV) and forged connectors, respectively.

As seen from FIG. 4, a damaged stretch of undersea pipeline is replaced with the aid of connector module system of this invention, which is dropped off from a ship. Production platforms (10) and (11) and risk zones (12) and (13) are shown. The job of replacing part of such undersea pipeline (14) takes place in the following stages: a) pipeline (14) is drained of fluid and washed; b) damaged stretch is withdrawn; c) ends are prepared and forged connectors (15, 16) installed; d) connector module (17) with ends already adjusted is dropped; e) a first alignment of connector module (17) with the ends of the pipeline (15, 16) takes place with the aid of pre-established guides; f) a connector module (17) hydraulic drive is worked by remotely operated vehicle (ROV); g) fine adjustment of couplings (18, 19, 20) (FIG. 3) is done, horizontally at (18), vertically at (19), and longitudinally at (20); h) a remotely operated vehicle (ROV) works mechanism of connector meant to close; i) the same procedure takes place at the other end; j) connectors are then tested; k) pigs are run through; and l) the pipeline goes into action.

As is to be seen from FIG. 5 which shows a further embodiment of the system of this invention, invented when it is fitted with two connector modules (21) to change a stretch of damaged undersea line, and though we repeat that such FIG. 5 does not show the forward and back ends of the loop of pipe, nor the ends of the T branch-off of the connector module, all of them are fitted with valves worked by remotely operated vehicle (ROV) and forged connectors, respectively. Such FIG. 5 shows production platforms (22) and (23), risk zones (24) and (25), emergency by-pass (26), undersea pipeline (27) and damaged area (28). Next, the stages in the changing of a damaged undersea line within a system already fitted with such components are given: a) finding the damaged area (28) with the aid of the remotely operated vehicle (ROV); b) shutting valves with the aid of remotely operated vehicle (ROV) at (29, 30); c) closing valves with the aid of remotely operated vehicle (ROV) at (31, 32); d) dropping of emergency by-pass line (26) from rig; e) making connections with aid of remotely operated vehicle (ROV) at (33, 34); f) opening valves with aid of remotely operated vehicle (ROV) at (29, 34, 33 and 30), and disconnecting connectors at (31, 32) in order to withdraw the damaged line, and then haul that line up.

Also, a third advantage is that when a new undersea line has to be added to a system already fitted with such components, or when a line has been for some reason fitted with a repair module, as shown in FIG. 5, where (35) is the new line and (36) the new well, such an operation is easily and efficiently done, all that is needed being to lay the fresh undersea line from the well (36) end, link it up with the line at (33), open valve (36) and open valve (33).

The main feature of this invention is that pipe end misalignments can be taken up without need of any large scale devices to bring them back into their original position.

I claim:

1. A connector module for use in dealing, repairing or extending an undersea pipeline, said connector module being operated by a remotely operating vehicle, said connector module comprising a structure having a front and a back and including a loop of pipe having ends projecting in opposite directions at the front and back of the structure, valves at said ends for operation by said remotely operated vehicle, said loop of pipe ends terminating in forged connectors for connection to a section of said pipeline; and wherein said structure further includes in an upper portion thereof, a stand-by T branch-off having at each of opposite ends thereof valves to be operated by said remotely operated vehicle and terminating in a forged connector for connection to an end of said pipeline.

2. A connection module according to claim 1, further provided with hydraulic means for adjusting the position of said ends of said loop of pipe spacially in three dimensions to overcome misalignment of the pipe ends with the ends of sections of pipeline without the need for any large scale devices to bring displaced pipeline ends back to their original position prior to effecting connections between the ends of the pipeline and the pipe ends of said loop of pipe.

3. A connection module according to claim 2, wherein said hydraulic means are operable by a remotely operated vehicle by means of hot-lines fitted laterally of said structure.

* * * * *